UNITED STATES PATENT OFFICE.

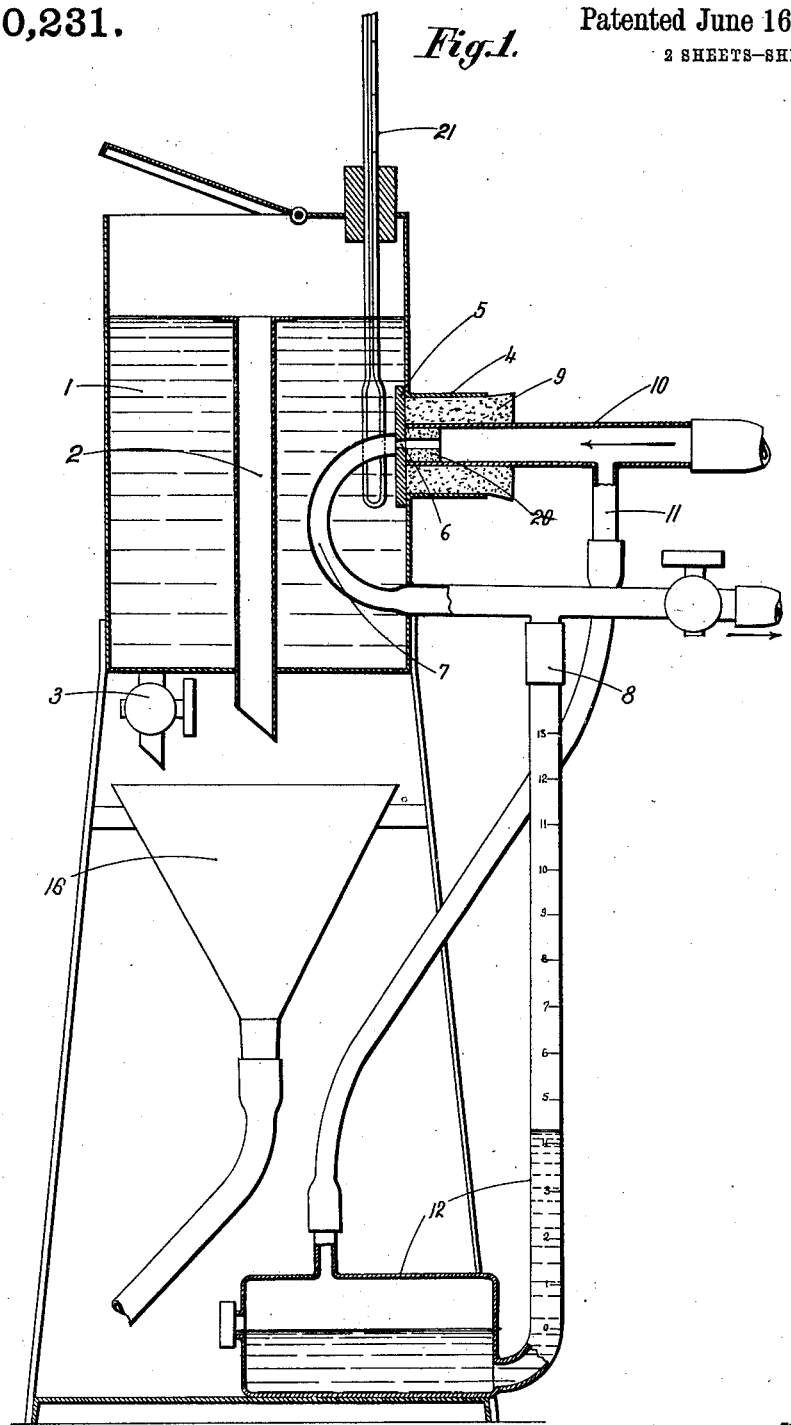

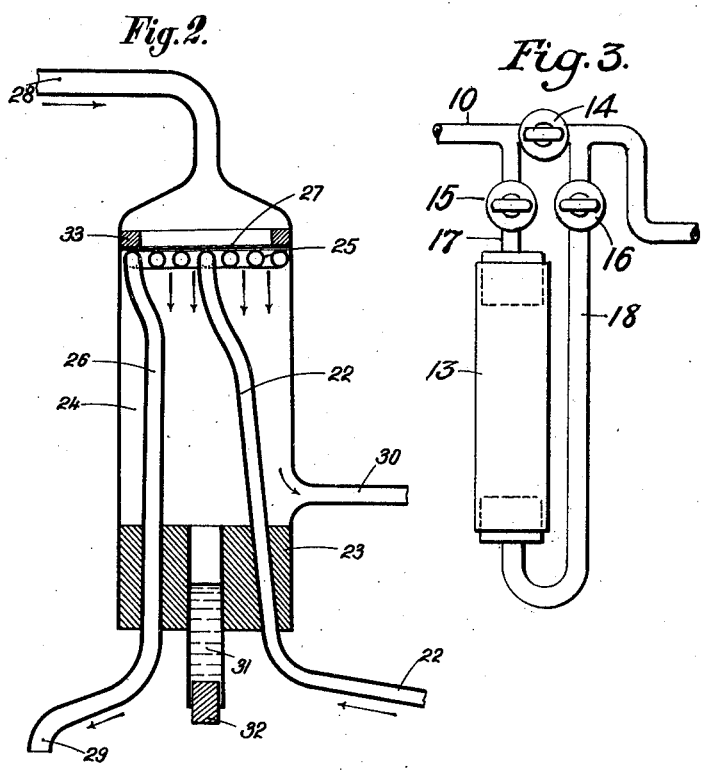

EMILE SAINTE-CLAIRE DEVILLE, OF PARIS, FRANCE, ASSIGNOR TO SOCIETE DU GAZ DE PARIS, OF PARIS, FRANCE, A CORPORATION OF FRANCE.

DEVICE FOR INDICATING NAPHTHALENE IN ILLUMINATING-GAS.

1,100,231. Specification of Letters Patent. Patented June 16, 1914.

Application filed April 24, 1913. Serial No. 763,384.

*To all whom it may concern:*

Be it known that I, EMILE SAINTE-CLAIRE DEVILLE, citizen of the French Republic, residing at Paris, Department of the Seine, in France, have invented certain new and useful Improvements in Devices for Indicating Naphthalene in Illuminating-Gas; and I do hereby declare the following to be a full, clear, and exact description of the invention, such as will enable others skilled in the art to which it appertains to make and use the same.

The invention has for its object an apparatus and method for measuring the quantity of naphthalene contained in illuminating gas, or, what amounts to the same thing, the temperature to which the gas must be cooled for the naphthalene vapor that it contains to become saturated.

The apparatus comprises essentially an obstruction or baffle arranged in the passage of the gas and partially obstructing this passage. This obstruction will increase in the course of the operation owing to the fact of the naphthalene of the gas that is deposited upon the restriction creating a partial obstruction there. A differential pressure gage, the two branches of which open upon either side of the constriction, indicates at any moment the loss of charge resulting from the resistance thus created.

The current of gas is caused to traverse a narrow passage, in such a manner that it is easy to cool it or to heat it to temperature $t$ indicated by a thermometer. The gas, however, retains its own temperature up to the precise point at which it enters the construction raised to $t°$. This peculiarity is essential. It is preferable and even important, in certain cases, to dry the gas prior to causing it to pass into the indicating apparatus. To do so, the gas to be tested is dried by means of dry calcium chlorid, the test vessel or other apparatus containing the chlorid being held almost in contact with the pipe in which the gas whose percentage of naphthalene it is desired to ascertain is circulating, in such a manner that the desiccation is effected at the temperature of the gas in the said pipe. No quantitative analysis should be attempted until three or four cubic meters of gas have passed over the chlorid of calcium at a velocity of from 40 to 50 liters per hour, in the case of a chlorid test vessel with a capacity of approximately a liter. Finally, in the intervals of time comprised between the quantitative analysis of naphthalene, the gas should never cease to circulate in the chlorid test vessel at a velocity which can be reduced to 10 or 15 liters per hour. When the gas is very poor in naphthalene, far too much time may elapse before the naphthalene deposited upon the constriction of the apparatus produces a suitable obstruction. In this case, artificial priming or starting may be employed. The gas previously dried under the conditions set forth, passes for some minutes through a branch into a small test tube containing naphthalene in the form of powder, at the temperature of the laboratory. Thus enriched, this gas will very rapidly partially obstruct the restriction. The direct passage for the gas to the constriction of the indicating apparatus is then reëstablished.

This apparatus is described in detail with reference to the accompanying drawing, in which:—

Figure 1 is a vertical section of one constructional form of apparatus embodying the invention. Fig. 2 is a vertical section of another constructional form of an indicator embodying the invention and serving solely for bringing the gas to a given temperature. Fig. 3 is an elevation of the naphthalene priming device.

The apparatus represented in Fig. 1 comprises a metal tank of approximately 300 cubic centimeters capacity, capable of containing 225 cubic centimeters of water up to the overflow 2 and provided with a thermometer 21. A drain cock 3 renders it possible to discharge the water contained in the tank rapidly into a funnel 16. Upon one of the plane and vertical walls of this tank a circular orifice of approximately 2 cm. in diameter is formed its center being located approximately midway between the bottom of the tank and the overflow. A cylindrical socket 4 is soldered to the edges of the aperture. This is closed by a copper washer 52 m. m. in thickness, soldered in the interior of the wall of the tank. This washer has at its center a small conical opening 6 which constitutes the narrow passage referred to above. The dimensions of this aperture are so regulated that it causes in the gas a loss of charge of from 30 to 40 m. m. of water for a supply of 50 to 60 liters per hour.

A copper tube 7 is fitted against the washer 5 to afford a passage for the gas that has passed through the orifice 6. This tube is bent inside the tank and leaves it through the wall. It is continued outside and conducts the gas to a burner (not shown) and at 8 is branched so as to connect with one of the branches of the differential pressure gage 12.

A cork plug 9 is frictionally fitted into the socket 4; axially this plug is traversed by a glass tube 10 from 7 to 8 m. m. in diameter, this tube serving to conduct the gas to be tested to the orifice 6. Internally it contains another small cork plug 20 pressed in until it is in contact with the washer 5 and perforated axially to a diameter not exceeding that of the base of the conical aperture 6. These arrangements serve to prevent the gas from experiencing the effects of the temperature of the tank before entering the constriction, the tube 10 communicates with the differential pressure gage through the socket 11.

A test is conducted in the following manner: The gas admission cock is opened and the gas at the burner kindled and the supply is then regulated in such a manner that the whole of the apparatus being at the ambient temperature, which is that of the gas, the pressure gage indicates a loss of charge of from 30 to 40 m. m., which is noted accurately. The tank is then filled with water at the temperature of the room, whereupon broken ice or a refrigerating salt is introduced a little at a time. The thermometer 21 falls progressively and a moment arrives at which, as the naphthalene crystals commence partially to obstruct the restriction 6 the pressure gage rises. It is allowed to rise 15 to 20 m. m., after which the cooling of the water is stopped. While the water is slowly heated in contact with the ambient air, the indications of the thermometer and of the pressure gage are noted simultaneously with great care and frequency. The pressure gage first of all attains a maximum from which it begins to fall. When this movement of descent appears to be sharply defined, the operation is finished. The saturation temperature sought is the mean of the temperature that have been observed during the whole time that the pressure gage has remained at its maximum point. The results can be checked by introducing a small quantity of ice into the water, in such a manner as to observe a second time the passage of the pressure gage to the maximum and the corresponding temperature.

In order to cause every trace of naphthalene to disappear in the constriction 6, it is only necessary to heat the water a few degrees by agitating therein a small iron ball previously heated over a gas jet.

The apparatus represented in Fig. 2 is intended to show if at a given temperature the gas is capable or not of depositing naphthalene crystals. A thin copper tube 22, of an internal diameter of 4 m. m. passes through a plug 23 and rises toward the center of a glass bell 24, which is 40 m. m. in diameter. Toward the summit of this bell, the tube is coiled in the form of a flat horizontal spiral 25 in such a manner that a slight clearance is left between the spirals, the outer spiral being prolonged by a vertical portion 26 which descends into the interior of the bell, passes through the plug 23 and ends at 29 in such a manner that a current of water entering in the tube 22 passes through the convolutions 25 and issues through the orifice 29. Upon the upper face of the convolutions 25, a plate of very fine metallic gauze 27 is fixed; this is raised to the temperature of the water circulating in the spiral tube. The crude gas (not dried) enters through the socket 28, passes through the gauze 27 and the plate constituted by the convolutions 25, then issues through a lateral socket 30, its velocity being that necessary for keeping fully kindled gas in a burner with a capacity of 140 liters per hour. The water which condenses in contact with the cooled plate falls into a glass tube 31 closed at its lower part by an india rubber plug 32. An india rubber washer 33 prevents the gas from passing at the badly cooled edges of the spiral plate.

The information given by the apparatus is as follows: If the burner is never extinguished and if on the other hand, a current of water at a temperature T° is constantly caused to circulate in the tube 22, 25, 26, 29, it will be certain that the gas is not saturated at 7° if crystals are not seen to appear upon the well-lighted surface of the metallic gauze 27.

As heretofore stated, when the gas is very poor in naphthalene, it may require too much time before the naphthalene deposited adjacent the opening 6 produces a suitable obstruction. In this case, artificial priming may be resorted to by a suitable priming device, such as shown in Fig. 3. It may consist of a receptacle 13 adapted to contain naphthalene in the form of powder, and so disposed that the gas on its way to the tank 1 may be made to pass through the same. When the valve 14, disposed in the conduit 10, is opened, and the valves 15 and 16, disposed in the conduits 17 and 18, respectively, are closed, the gas passes directly to the tank 1 through the conduit 10. If the valve 14, however, be closed and valves 15 and 16 opened, the gas passes from conduit 10, through the conduit 18, then through the naphthalene receptacle 13 back to the main conduit 10, and thence to the tank 1. The naphthalene contained in the tube or receptacle 13 serves to enrich the gas, so that the obstruction is quickly formed at the restricted opening 6.

By appropriate means it is possible to impart to the water the temperature prevailing in the sub-soil of the city at the mean depth at which the gas pipes are laid. Consequently, any gas that does not deposit naphthalene in the trap can be regarded as unobjectionable for the mains for practical purposes and vice versa.

It is obvious that the invention is not limited to the constructional forms represented in the drawing it is possible to modify the device intended for creating a resistance to the passage of the gas, and to replace the perforated diaphragm by a coil, very fine metallic gauze and so forth.

I claim:

1. An apparatus of the kind described, comprising a conduit for the gas, means interposed in the path of the gas passing through the conduit to cause the gas to pass through a restricted opening, means to cool the gas as it issues from said opening, a pressure device subject to the pressure of the gas in the conduit in advance of and beyond said opening, and means to determine the degree to which the gas is cooled as it issues from said opening.

2. An apparatus of the kind described, comprising a conduit for the gas, means interposed in the path of the gas passing through the conduit to cause the gas to pass through a restricted opening, means to permit a cooling medium to cool the gas as it issues from said opening, means to determine the temperature of said cooling medium, and means to determine the difference in pressure existing in the conduit in advance of and beyond the opening.

3. An apparatus of the kind described, comprising a casing, an inlet and an outlet associated with the casing, means to cause the gas passing through the inlet to flow through a restricted opening, means to determine the difference of pressure existing in the conduit in advance of and beyond the opening, said casing adapted to contain a cooling medium which acts upon the gas as it issues from said opening, and means to determine the temperature of said cooling medium.

4. An apparatus of the kind described, comprising a conduit for the gas, means interposed in the path of the gas passing through the conduit to cause the gas to pass through a restricted opening, means to cool the gas as it issues from said opening, a pressure device subject to the pressure of the gas in the conduit in advance of and beyond said opening, means to determine the degree to which the gas is cooled as it issues from said opening, and means to charge the gas with that substance which the apparatus is adapted to deposit at the opening before the gas passes through said opening.

5. An apparatus for determining the saturation temperature of gas with naphthalene vapor consisting of a conduit through which the gas is caused to pass, means interposed in the path of the gas to cause the same to pass through a restricted opening, means to indicate the difference of pressure in the conduit in advance of and beyond said opening, means to cool the gas as it issues from said opening, means to determine the degree to which the gas is cooled, and a priming device through which the gas passes before it passes through the opening consisting of a receptacle containing naphthalene crystals.

In testimony whereof I affix my signature, in presence of two witnesses.

EMILE SAINTE-CLAIRE DEVILLE.

Witnesses:
HANSON C. COXE,
LOUIS LOSSE.